United States Patent Office 3,555,066
Patented Jan. 12, 1971

3,555,066
ORGANO-LITHIUM DERIVATIVES OF ALPHA-SILYLMETHYL SULFIDES
Gary E. Le Grow, Midland, Mich., assignor to Dow Corning Corporation, Midland, Mich., a corporation of Michigan
No Drawing. Filed Dec. 13, 1968, Ser. No. 783,748
Int. Cl. C07f 7/08, 7/10
U.S. Cl. 260—448.2                         5 Claims

ABSTRACT OF THE DISCLOSURE

Organosilyl compounds of the formula $$R_3Si-\underset{R'}{\underset{|}{\overset{Li}{\overset{|}{C}}}}-SR''$$

where R is hydrocarbon, H, or $NX_2$, R' is $R_3Si-$ or hydrocarbon, R'' is alkyl or phenyl and X is alkyl are prepared by reacting $$R_3Si-\underset{R'}{\underset{|}{\overset{H}{\overset{|}{C}}}}-SR''$$

with alkyl lithium compounds. The lithium compounds are useful as polymerization catalysts for styrene.

---

This invention relates to compounds of the formula $$R_x\underset{H_{2-x}}{\overset{Li}{\overset{|}{C}}}-SR'$$

where $x$ is 1 or 2, R is $R''_3Si$ or a hydrocarbon radical free of aliphatic unsaturation, at least one R being $R''_3Si$ in which R'' is hydrogen, a hydrocarbon radical free of aliphatic unsaturation or $X_2N-$ in which X is an alkyl radical and R' is an alkyl or phenyl radical.

As can be seen the compounds of this invention include structures of the formulae $$(R''_3Si)_2\overset{Li}{\overset{|}{C}}-SR'$$

$$R''_3Si\underset{Li}{\overset{R}{\overset{|}{C}}}-SR' \quad \text{and} \quad R''_3Si\underset{Li}{\overset{H}{\overset{|}{C}}}-SR'$$

The compounds of this invention are best prepared by reacting $R_xCH_{2-x}SR'$ where $x$ is 1 or 2 with an alkyl lithium compound in the presence of tetra-hydrofuran. The usual precautions to exclude moisture and oxygen should be used as with any organo-metallic reaction. The best way of carrying out the reaction is to add the alkyl-lithium compound to a solution of the silyl sulfide in tetra-hydrofuran at a temperature ranging from 0° to —40° C. Carrying out this reaction at low temperature avoids undesirable side reactions. The rate of addition should be such that the approximate temperature range is as above specified throughout the reaction.

Once the compound $$R_x\underset{H_{2-x}}{\overset{Li}{\overset{|}{C}}}SR'$$

is formed it is stable at room-temperature or above and the mixture can be used to make bis- or tris-$R''_3SiCSR'$ derivatives disclosed and claimed in applicant's copending application filed concurrently herewith. The lithium compounds of this invention are also useful as catalysts in the polymerization of olefins such as styrene in which stereo regular polymers are produced.

The starting materials of the formula $R''_3SiCH_2SR'$ can be prepared by reacting known compounds of the formula $R''_3SiCH_2Cl$ with $NaSR'$ in the normal manner for reacting sodium salts of mercaptans with haloalkyl compounds. Those starting materials of the formula $$R''_3Si\underset{H}{\overset{R}{\overset{|}{C}}}-SR'$$

can be prepared in accordance with the method of Wetterlin et al., Acta. Chem. Scand. 18 (4) 899–903 (1964), which involves reacting compounds of the formula $R''_3SiCHClR$ with R'SH in the presence of NaOH in an aqueous alcohol solution. An alternative method shown in this publication is that of reacting compounds of the formula $R''_3SiCH=CH_2$ with R'SH under the influence of di-tertiarybutyl peroxide. The latter method, however, does not give very good yields of the desired materials. The most versatile method is by reacting $$(R''_3Si)_x\underset{H_{2-x}}{\overset{Li}{\overset{|}{C}}}SR'$$

with RI as shown in Example 4 infra.

Those starting compounds of the formula $$(R''_3Si)_2CHSR'$$

are best prepared in accordance with the method set forth in applicant's copending application Ser. No. 783,749 filed Dec. 13, 1968 which is hereby incorporated in its entirety by reference. This involves the reaction of compounds of the formula $$R''_3Si\underset{H}{\overset{Li}{\overset{|}{C}}}-SR'$$

with $R''_3SiCl$ in amount of 1 mole of the latter per mole of the former.

For the purpose of this invention R can be any alkyl radical such as methyl, ethyl, isopropyl, butyl, octadecyl or myricyl; any aryl radical such as phenyl, naphthyl, anthracyl or xenyl; any alkaryl radical such as tolyl, xylyl or ethylphenyl; or any aralkyl radical such as benzyl, beta-phenylethyl or beta-phenylpropyl. R can also be any $R''_3Si$ radical in which R'' is hydrogen or any alkyl, aryl, aralkyl or aralkyl radical shown above or R and in addition R'' can be a $X_3N-$ radical in which X is an alkyl radical such as methyl, ethyl, isopropyl or octadecyl.

For the purpose of this invention R' can be any alkyl radical such as methyl, ethyl, isopropyl, hexyl, octadecyl or myricyl; or the phenyl radical.

In addition to the utilities shown above the compounds of this invention are useful as intermediates in the synthesis of other organosilicon compounds such as those shown in the aforesaid copending application. They can also be used for synthesizing other organic compounds.

The following examples are illustrative only and should not be construed as limiting the invention which is properly delineated in the appended claims.

EXAMPLE 1

0.125 m. of $(CH_3)_3SiCH_2SCH_3$ was dissolved in 200 ml. of tetrahydrofuran and cooled to —25° C. 0.125 m. of n-butyllithium in 100 ml. of hexane was then added slowly with stirring and the temperature was held at —25° C. for an additional hour. The solution was allowed to warm to room-temperature.

A N.M.R. spectrum was run on a 10% solution of the product and peaks appeared at 10.02 and 10.07 tau. These peaks are not present in the spectrum of $$(CH_3)_3SiCH_2SCH_3$$

or in the spectrum of butyllithium. The peaks represent the presence of carbanion

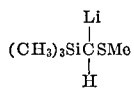

As further proof of structure of the lithium derivative the product was reacted with 1.59 moles of methyl iodide at room-temperature. Water was then added and the product was extracted with ether. The extract was dried and the product was distilled to give an 85% yield of the derivative $$(CH_3)_3Si\underset{\underset{CH_3}{|}}{CH}SCH_3$$

The structure of this derivatve was proven by N.M.R. and elemental analysis. It boils at 81.5° C. at 70 mm. has a refractive index at 25° C. of 1.4537, a density at 25° C. of 0.846 and a specific refraction found 0.3199 and calculated 0.3198.

EXAMPLE 2

When

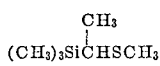

is reacted with $(CH_3)_3SiCl$ by adding the chlorosilanes to a tetrahydrofuran solution of $$(CH_3)_3Si\underset{\underset{Li}{|}}{CH}SCH_3$$

the compound $\{(CH_3)_3Si\}_2CHSCH_3$ is obtained. When the latter is dissolved in tetrahydrofuran and reacted with butyllithium as in Example 1, the compound $\{(CH_3)_3Si\}_2CLiSCH_3$ is obtained.

EXAMPLE 3

When

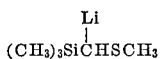

is used as a starting material in the process of Example 1, the compound

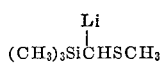

is obtained.

EXAMPLE 4

A solution of 0.1 m. of $(CH_3)_3SiCH_2SC_6H_5$ in 50 ml. of tetrahydrofuran was cooled to —30° C. and .05 m. of n-butyllithium in 32 ml. of hexane was added over a 15 minute period. The solution became bright yellow. It was stirred an additional 2 hours at —30° C. The bright yellow color was due to the formation of $$(CH_3)_3Si\underset{\underset{Li}{|}}{CH}SC_6H_5$$

The structure was further proved by the addition of methyl iodide to give a clear solution indicating the formation of $$(CH_3)_3Si\underset{\underset{CH_3}{|}}{CH}SC_6H_5$$

EXAMPLE 5

The compound

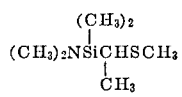

was made by reacting

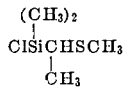

with two equivalents of $(CH_3)_2NH$ in hexane at room-temperature. .039 mole of

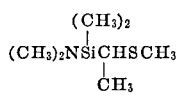

was dissolved in 60 ml. of tetrahydrofuran and .039 mole of butyl lithium in 25 ml. of hexane was added at 0° C. The solution turned bright yellow and was stirred for one hour. The compound

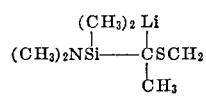

was obtained.

The compound

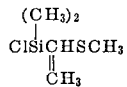

was prepared by reacting vinyldimethylchloromethylsilane with methyl mercaptan in the presence of a small amount of azo-bis-butyronitrile at room-temperature under ultraviolet light.

EXAMPLE 6

When

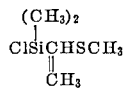

is reduced with lithium aluminum hydride the compound

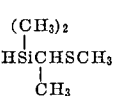

is obtained.

When this compound is reacted with n-butyl lithium in accordance with the procedure of Example 5, the compound

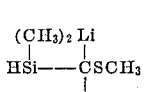

is obtained.

EXAMPLE 7

When the following silanes are substituted in the procedure of Example 1, the following products are obtained:

| Silane | Product |
|---|---|
| (CH$_3$)$_2$<br>C$_{18}$H$_{37}$SiCH S C$_{18}$H$_{37}$<br>$\|$<br>C$_{18}$H$_{37}$ | (CH$_3$)$_2$ Li<br>C$_{18}$H$_{37}$Si——C S C$_{18}$H$_{37}$<br>$\|$<br>C$_{18}$H$_{37}$ |
| CH$_3$<br>{(CH$_3$)$_2$N}$_2$SiCH$_2$S CH$_3$ | CH$_3$ Li<br>{(CH$_3$)$_2$N}$_2$Si——CH S CH$_3$ |
| (C$_6$H$_5$)$_3$SiCH$_2$SCH$_3$ | Li<br>(C$_6$H$_5$)$_3$SiCHSCH$_3$ |
| (CH$_3$)$_2$<br>CH$_3$CHCH$_2$SiCH$_2$S CH$_3$<br>$\|$<br>C$_6$H$_5$ | (CH$_3$)$_2$ Li<br>CH$_3$CHCH$_2$Si——CH S CH$_3$<br>$\|$<br>C$_6$H$_5$ |
| 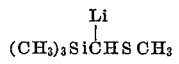(CH$_3$)$_2$<br>S⟩—SiCH$_2$S CH$_3$ | (CH$_3$)$_2$<br>S⟩—SiCH S CH$_3$<br>Li |
| (CH$_3$)$_3$SiCH S CH$_3$<br>$\|$<br>C$_6$H$_5$ | Li<br>(CH$_3$)$_3$SiC S CH$_3$<br>$\|$<br>C$_6$H$_5$ |
| (CH$_3$)$_2$<br>CH$_3$C$_6$H$_4$SiCH$_2$S CH$_3$ | (CH$_3$)$_2$<br>CH$_3$C$_6$H$_4$SiCH S CH$_3$<br>$\|$<br>Li |
| (CH$_3$)$_3$SiCH S CH$_3$<br>$\|$<br>CH$_2$<br>$\|$<br>C$_6$H$_5$ | Li<br>(CH$_3$)$_3$SiC S CH$_3$<br>$\|$<br>CH$_2$<br>$\|$<br>C$_6$H$_5$ |

That which is claimed is:
1. A composition of the formula $$\underset{R_xCH_{2-x}SR'}{\overset{Li}{|}}$$

in which x is an integer from 1 to 2,
R is selected from the group consisting of hydrocarbon radicals free of aliphatic unsaturation and radicals of the formula R''$_3$Si at least one R being R''$_3$Si in which R'' is selected from the group consisting of hydrogen atoms, hydrocarbon radicals free of aliphatic unsaturation and X$_2$N radicals in which
X is an alkyl radical and
R' is an alkyl radical or a phenyl radical.

2. A compound of the formula $$\underset{(CH_3)_3SiCHSCH_3}{\overset{Li}{|}}$$

3. A compound of the formula $$\underset{(CH_3)_3SiCHS C_6H_5}{\overset{Li}{|}}$$

4. A compound of the formula $$\underset{(CH_3)_2N Si——C S CH_3}{\overset{(CH_3)_2 \ \ \ Li}{| \ \ \ \ \ \ \ \ \ |}}$$
$$\overset{}{\underset{CH_3}{|}}$$

5. A compound of the formula $$\underset{H Si——C S CH_3}{\overset{(CH_3)_2 \ \ Li}{| \ \ \ \ \ \ \ \ |}}$$
$$\overset{}{\underset{CH_3}{|}}$$

References Cited
UNITED STATES PATENTS 2,960,492  11/1960  Morton et al. ___ 260—448.2XR
3,078,292   2/1963  Prober _____ 260—448.2(N)

TOBIAS E. LEVOW, Primary Examiner

P. F. SHAVER, Assistant Examiner

U.S. Cl. X.R.
260—93.5, 669